US010504012B2

United States Patent
Kumahashi (10) Patent No.: US 10,504,012 B2
(45) Date of Patent: Dec. 10, 2019

(54) IMAGE PROCESSING APPARATUS ACCEPTING SPECIFIC PRINTING FUNCTION, IMAGE PROCESSING METHOD, IMAGE FORMING APPARATUS, AND STORAGE MEDIUM

(71) Applicant: CANON KABUSHIKI KAISHA, Tokyo (JP)

(72) Inventor: Shu Kumahashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/055,372

(22) Filed: Aug. 6, 2018

(65) Prior Publication Data
US 2019/0050695 A1 Feb. 14, 2019

(30) Foreign Application Priority Data
Aug. 10, 2017 (JP) .................... 2017-155917

(51) Int. Cl.
*G06K 15/02* (2006.01)
*G06F 3/12* (2006.01)

(52) U.S. Cl.
CPC ......... *G06K 15/1857* (2013.01); *G06F 3/122* (2013.01); *G06F 3/1206* (2013.01); *G06F 3/1248* (2013.01); *G06K 15/1852* (2013.01); *G06F 3/1245* (2013.01); *G06F 3/1285* (2013.01)

(58) Field of Classification Search
None
See application file for complete search history.

(56) References Cited

U.S. PATENT DOCUMENTS

| 9,703,512 B2 | 7/2017 | Kanai | |
|---|---|---|---|
| 2009/0021785 A1* | 1/2009 | Okabe | G06F 3/1273 358/1.15 |
| 2016/0210093 A1* | 7/2016 | Kanai | G06F 3/1248 |

FOREIGN PATENT DOCUMENTS

JP 2016-132116 A 7/2016

* cited by examiner

Primary Examiner — Lennin R Rodriguezgonzalez
(74) Attorney, Agent, or Firm — Venable LLP (57) ABSTRACT

An image processing apparatus of the present invention includes a plurality of PDL processing units configured to execute analysis processing corresponding to a type of PDL data, an operation unit configured to accept a user's instruction for implementing a specific printing function, and a control unit configured to control execution of printing processing based on the user's instruction accepted by the operation unit. The control unit starts, in accordance with the acceptance of the user's instruction by the operation unit, reserving work memory to be used for the analysis processing by a PDL processing unit, among the plurality of PDL processing units, which corresponds to PDL data included in a print job associated with the user's instruction.

11 Claims, 10 Drawing Sheets

IMAGE PROCESSING APPARATUS ACCEPTING SPECIFIC PRINTING FUNCTION, IMAGE PROCESSING METHOD, IMAGE FORMING APPARATUS, AND STORAGE MEDIUM

BACKGROUND OF THE INVENTION

Field of the Invention

The present invention relates to an image processing apparatus which supports a plurality of page description languages of different types, an image processing method, an image forming apparatus, and a storage medium.

Description of the Related Art

In printing a text and an image created by a computer, various page description languages (hereinafter referred to as a PDL) are known as languages for the computer to give drawing instructions to an image forming apparatus such as a printing apparatus. As representative PDLs, there are, for example, a LIPS, a print command language (hereinafter referred to as PCL), and a PDF.

In general, image forming apparatuses such as a single function printer (SFP) and a multifunction printer (MFP) support printing under a plurality of PDL types. These image forming apparatuses interpret each of drawing instructions described in the plurality of PDL types to create image data (hereinafter referred to as page data) of a bitmap format by a page unit. Further, these image forming apparatuses perform printing based on the created page data. For instance, in the technique disclosed in Japanese Patent Laid-Open No. 2016-132116, a PDL type of a received print job is determined, work memory is reserved in accordance with a processing module that corresponds to this PDL type, and the processing module is activated by using the reserved work memory. Then, after completing the analysis of the PDL by the activated processing module, the reserved work memory is released. As such, memory saving is achieved by reserving the work memory as required.

SUMMARY OF THE INVENTION

In the technique disclosed in Japanese Patent Laid-Open No. 2016-132116, memory saving is achieved by starting reservation of work memory after receiving a print job and determining a PDL type used in the print job. If the start of reservation of work memory can be made in earlier timing, it is possible to complete reservation of work memory in earlier timing as well, and thus process PDL data in the print job more efficiently.

The present invention provides a technique of processing a print job more efficiently while achieving memory saving for work memory for supporting a plurality of PDL data of different types.

The image processing apparatus of the present invention for resolving the above problem comprises: a plurality of PDL processing units configured to execute analysis processing corresponding to a type of PDL data; an operation unit configured to accept a user's instruction for implementing a specific printing function; and a control unit configured to control execution of printing processing based on the user's instruction accepted by the operation unit, wherein the control unit starts, in accordance with the acceptance of the user's instruction by the operation unit, reserving work memory to be used for the analysis processing by a PDL processing unit, among the plurality of PDL processing units, which corresponds to PDL data included in a print job associated with the user's instruction.

Further features of the present invention will become apparent from the following description of exemplary embodiments with reference to the attached drawings.

DESCRIPTION OF THE EMBODIMENTS

Hereinafter, with reference to the attached drawings, the embodiments of the present invention are explained in detail. Constituent elements shown in the following embodiments are merely exemplary and the scope of the present invention is not directed to limiting those. In addition, not all of the combinations of the constituent elements described in the present embodiments are essential for solving the problem to be solved by the present invention.

First Embodiment

Figure 1:
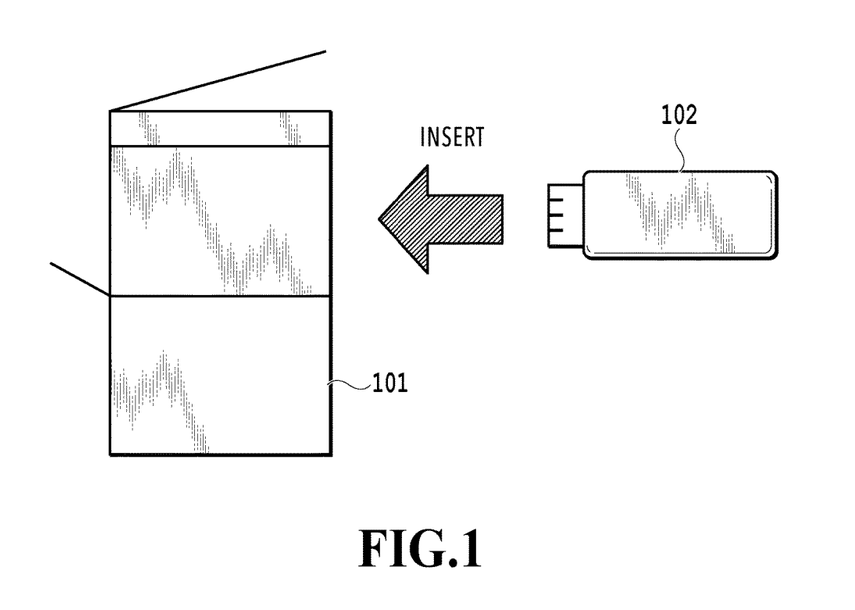
FIG. 1 is a diagram showing one example of a system configuration according to a first embodiment.

FIG. 1 is a diagram showing one example of a system configuration according to the first embodiment. An image forming apparatus 101 of the present embodiment is a connectable apparatus by inserting USB memory 102 which is one type of removable media into a non-illustrated connector, and is an apparatus capable of printing data stored in the connected USB memory 102. As printable formats, the image forming apparatus 101 supports a PDF, a JPEG, and a TIFF, all of which are typical formats. PDF is one type of PDLs and requires PDL comparison processing and PDL processing in the case of job processing as will be described later. The JPEG and TIFF are image data, and require no PDL comparison processing or PDL processing in the case of job processing. In the USB memory 102, one or more data printable in the image forming apparatus 101 are stored.

Figure 2:
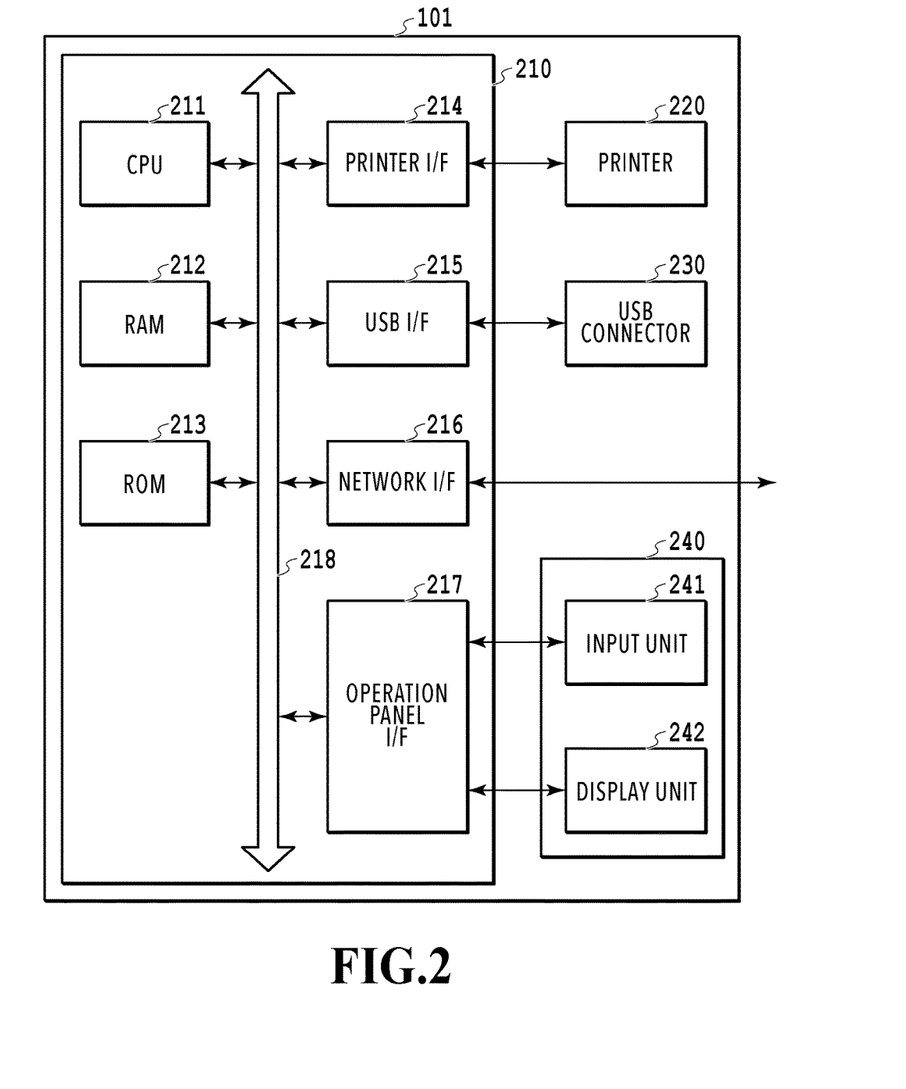
FIG. 2 is a block diagram showing one example of a hardware configuration of an image forming apparatus according to the first embodiment.

FIG. 2 is a block diagram showing one example of a hardware configuration of the image forming apparatus 101 according to the first embodiment. The image forming apparatus 101 includes a control unit 210, a printer 220, a USB connector 230, and an operation panel 240. The control unit 210 includes a CPU 211, a RAM 212, a ROM 213, a printer interface (an interface is hereinafter referred to as an I/F) 214, a USB I/F 215, a network I/F 216, and an operation panel I/F 217. Each of the units in the control unit 210 is connected via a system bus 218.

The control unit 210 including the CPU 211 controls the entire operation of the image forming apparatus 101.

Figure 3:
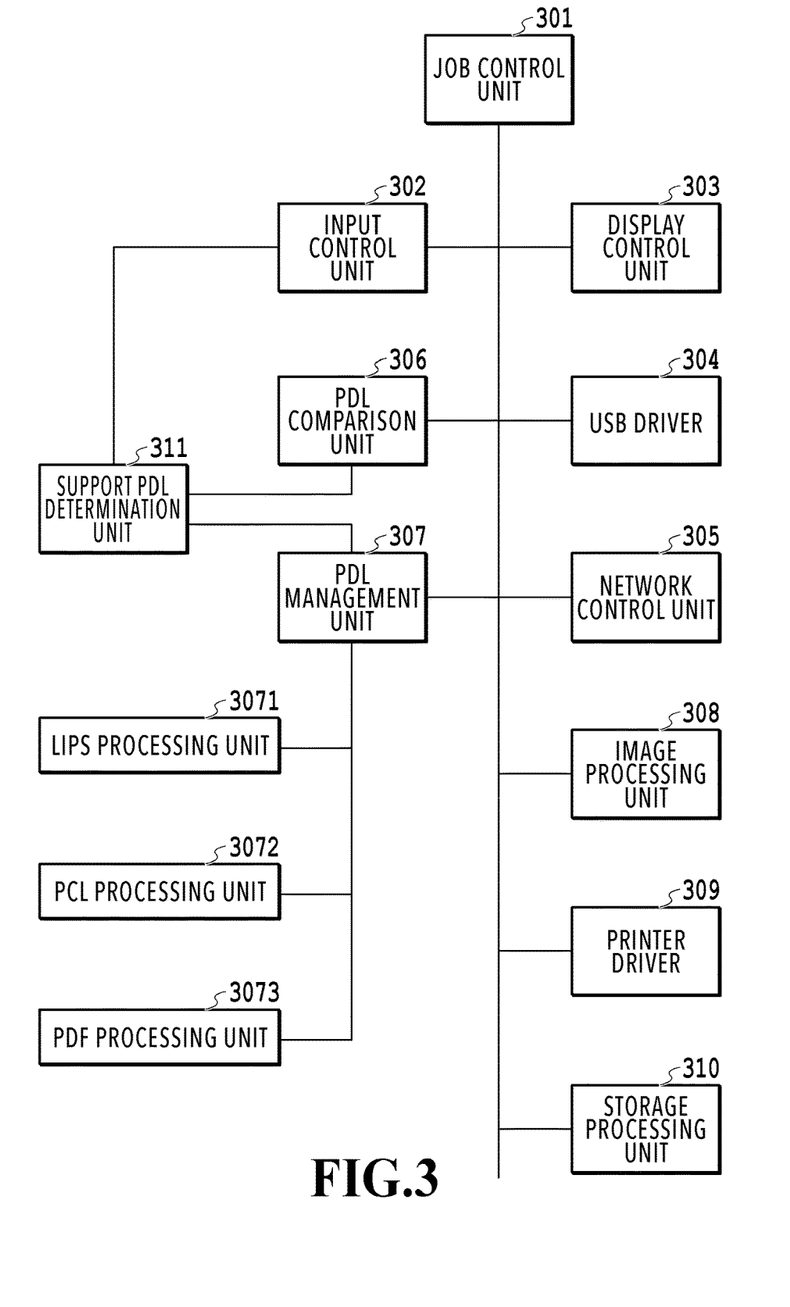
FIG. 3 is a block diagram showing one example of a software module configuration of the image forming apparatus.

The CPU 211 is a central processing unit. Software modules to be described in FIG. 3 are all operated in this CPU 211. The CPU 211 functions to control each of the elements within the image forming apparatus 101 via the system bus 218.

The RAM 212 is a random access memory which is accessible by the CPU 211. The RAM 212 is used as a storage area for storing page data and the like to be created in the case where each of processing units (LIPS processing unit 3071, PCL processing unit 3072, and PDF processing unit 3073) to be described later processes print data for a print job. The RAM 212 is also used as a storage area for which stored data is read, and is used as an area for reserving work memory required for software operation as will be described later.

The ROM 213 is read only memory. The ROM 213 is used as a storage area for which stored data is read. In the ROM 213, software modules to be described later in FIG. 3 are stored, which are to be read by the CPU 211 for execution.

The printer I/F 214 is an interface unit with the printer 220 (printer engine), and serves to output image signals to the printer 220.

The USB I/F 215 is an interface unit with the USB connector 230, and serves to input/output data stored in the USB memory 102.

The network I/F 216 is connected to an external network, and serves to input/output print data and device information.

The operation panel I/F 217 is an interface unit with the operation panel 240, and outputs bitmap data to be displayed on a display unit 242 in the operation panel 240 to the display unit 242 in the operation panel 240. Further, the operation panel I/F 217 serves a role to transmit to the CPU 211 information inputted by a user of the image forming apparatus 101 through an input unit 241 in the operation panel 240. The operation panel 240 includes, as the display unit 242, an LCD panel and a sound source, for example, and includes, as the input unit 241, hard keys and the like. The operation panel 240 includes a touch panel which is equipped with both functions of the input unit 241 and the display unit 242.

FIG. 3 is a diagram showing one example of a software module configuration of the image forming apparatus 101 according to the first embodiment. Each of the software modules of the image forming apparatus 101 is executed by the CPU 211 by loading a program code stored in a storage processing unit 310 onto the RAM 212.

A job control unit 301 integrally controls each of the software components in the image forming apparatus 101. The job control unit 301 creates a job (for example, a print job and a copy job) in accordance with an instruction received from an input control unit 302 and a network control unit 305 to perform job processing. In the case where a created job is a print job, determination is made as to whether data of the print job corresponds to PDL data or corresponds to image data. After the completion of the determination, an instruction is given to another functional unit, which is a functional unit other than the job control unit 301, in accordance with the determination result at appropriate timing so as to process the inserted job in a fixed order. In addition, the job control unit 301 gives an instruction of activation processing to another functional unit upon turning on the power of the image forming apparatus 101.

The input control unit 302 controls the input unit 241 in the operation panel 240. The input control unit 302 waits for an instruction input from the user, and notifies another functional unit, which is a functional unit other than the input control unit 302, of the received instruction content.

A display control unit 303 displays an operation menu and an instruction result on the display unit 242 in the operation panel 240 in accordance with an instruction from another functional unit, which is a functional unit other than the display control unit 303.

The USB driver 304 controls the USB I/F 215, and executes the input/output of information between the image forming apparatus 101 and the USB memory 102 in accordance with an instruction from another functional unit, which is a functional unit other than the USB driver 304.

The network control unit 305 controls the network I/F 216, and executes the input/output of information between the image forming apparatus 101 and an external terminal such as a personal computer or a smartphone.

A PDL comparison unit 306 determines whether a specific PDL can be processed in a currently active PDL processing unit in accordance with an instruction from a support PDL determination unit 311 as will be described later. The specific PDL is specified by the input control unit 302 which calls the PDL comparison unit 306. This is hereinafter called PDL comparison processing. A specific determination method is a method of searching, for example, based on processable PDLs stored in an information table area 702 of the RAM 212 as an information table by each PDL processing unit, whether a specific PDL is present within a table of the currently active PDL processing unit.

A PDL management unit 307 manages each of the PDL processing units (LIPS processing unit 3071, PCL processing unit 3072, and PDF processing unit 3073) for executing analysis processing on a PDL in print data. To be more specific, in accordance with an instruction from the job control unit 301 or the support PDL determination unit 311, work memory of a PDL processing unit activating at that time is released. In other words, processing to disable a PDL analysis function for the activating PDL processing unit is performed. Then, work memory for a PDL processing unit that can process a PDL specified by the support PDL determination unit 311 is reserved. Next, by using this work memory, the PDL processing unit that can process the specified PDL is activated. In other words, processing is made to enable the PDL analysis function of the PDL processing unit that can process the specified PDL. Hereinafter, processing of switching between disabling processing and enabling processing is called switching processing. More specifically, the PDL management unit 307 also includes a function as a switching processing unit. Then, in accordance with an instruction from the job control unit 301, using an activating PDL processing unit, a drawing instruction described by the PDL included in the print data is interpreted to execute processing of creating page data. This is hereinafter called PDL processing.

The LIPS processing unit 3071 includes a LIPS analysis function that interprets a drawing instruction described by the LIPS and creates page data. The PCL processing unit 3072 includes a PCL analysis function that interprets a drawing instruction described by a PCL and creates page data. The PDF processing unit 3073 includes a PDF analysis function that interprets a drawing instruction of a PDF file which is an electronic document format of data including a PDF drawing instruction and creates page data.

An image processing unit 308 executes image processing such as calibration and color conversion on image data such as JPEG and on page data created by each of the PDL processing units.

A printer driver 309 controls the printer I/F 214, and executes printing processing in accordance with an instruction from the job control unit 301.

The storage processing unit 310 writes specified data into the RAM 212 or reads stored data from the RAM 212 or the ROM 213 in accordance with an instruction from another functional unit other than the storage processing unit 310. In the present embodiment, in accordance with instructions from the job control unit 301 and the later-described support PDL determination unit 311 in particular, the storage processing unit 310 executes the write/read of an operation management flag as will be described later in detail. Alternatively, the storage processing unit 310 may be implemented in the RAM 212 or the ROM 213.

Figure 4:
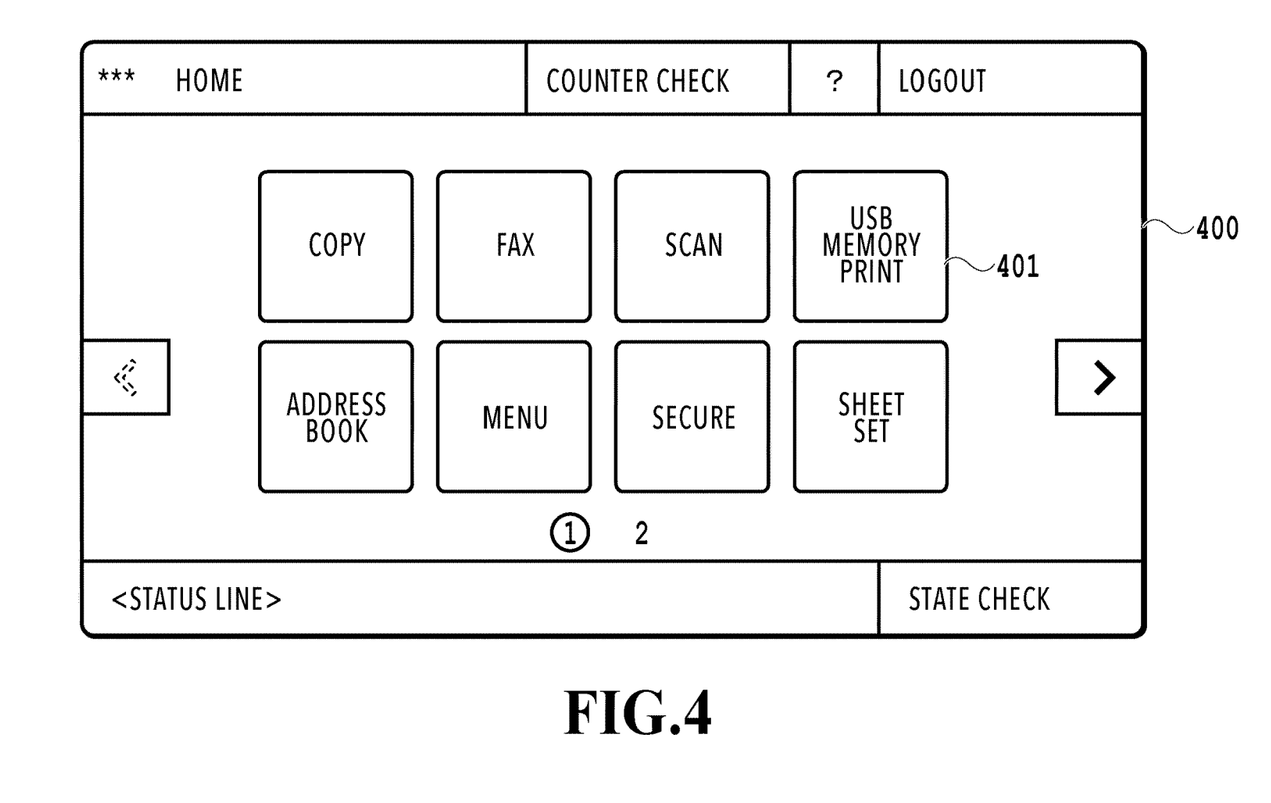
FIG. 4 is a diagram showing one example of a home screen displayed on an operation panel of the image forming apparatus.

The support PDL determination unit 311 determines whether a PDL that supports a function selected on the home screen 400 can be processed by one PDL processing unit. In a case where processing can be made in one PDL processing unit, the support PDL determination unit 311 gives an instruction to the PDL comparison unit 306 for executing PDL comparison processing. Further, in accordance with the result of the PDL comparison processing, the support PDL determination unit 311 gives an instruction to the PDL management unit 307 for executing switching processing. As a specific determination method, for instance, a PDL processing unit that is likely to be used by a function is firstly stored in the information table area 702 of the RAM 212 as an information table. Next, a PDL processing unit that is likely to be used by a selected function is read from the information table to determine whether the read number is one or not.

It is also possible to configure all components including the job control unit 301 and operating under the job control unit 301 as an image processing apparatus which is independent from the image forming apparatus 101.

FIG. 4 is a diagram showing one example of the home screen 400 displayed on the operation panel 240 of the image forming apparatus 101 according to the present embodiment. In the home screen 400, buttons (instructions) corresponding to functions (such as copy, fax, and scan) which can be implemented by the image forming apparatus 101 are selectably displayed. In this example, functional buttons including copy, fax, scan, address book, menu, secure, and sheet set as well as a USB memory print button 401 are displayed. A user presses any button to select an instruction to implement one of those functions. Once the USB memory print button 401 is pressed by the user, an instruction to implement a USB memory print function is accepted. At this time, a file selection screen 500 which is an operation screen of the USB memory print function is displayed on the operation panel 240. In a case where a button other than the USB memory print is pressed by the user, an instruction for implementing a function corresponding to the pressed button is accepted. At this time, an operation screen corresponding to the function is displayed on the operation panel 240. In the present embodiment, the USB memory print button 401 is associated with the job control unit 301 and the support PDL determination unit 311. Accordingly, once the USB memory print button 401 is pressed, parallel processing P1 to be described later will be started.

Incidentally, in the present embodiment, the explanation has been given on the case of applying the touch panel operated by the user's direct touch on the screen, but the present invention is not limited to this. A user interface other than the touch panel may be applied as well.

Figure 5:
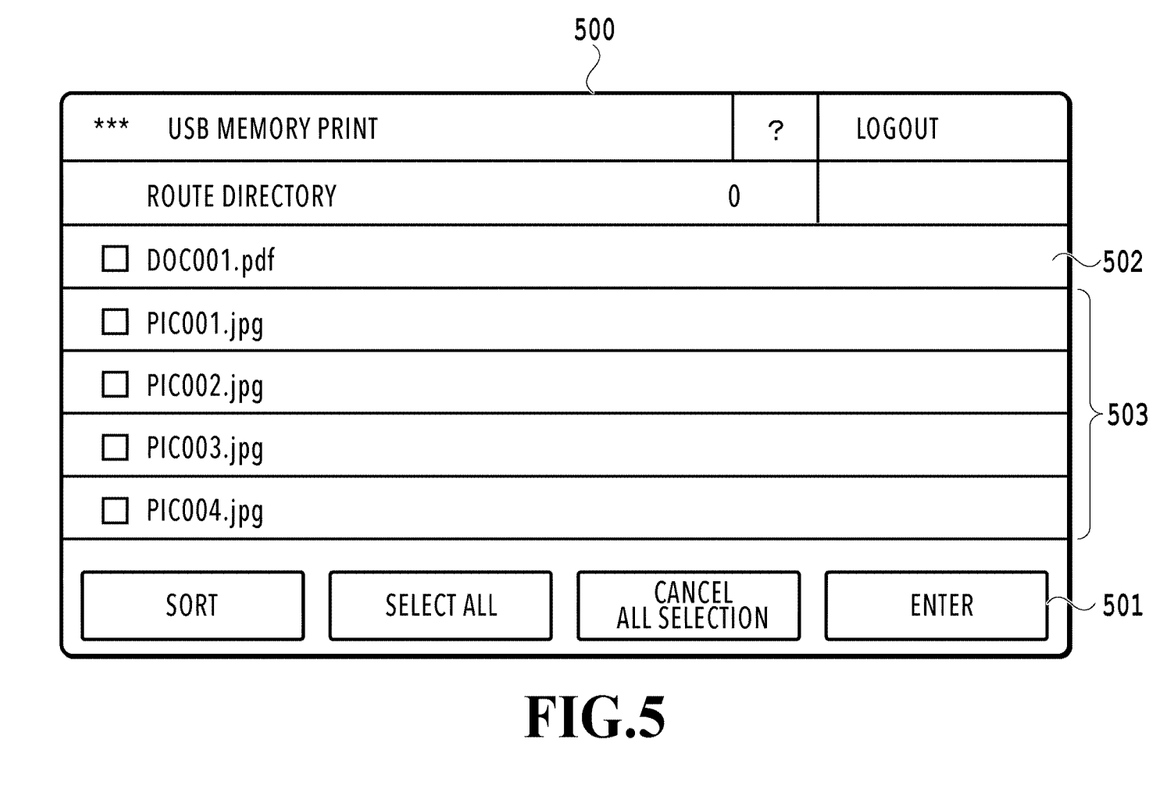
FIG. 5 is a diagram showing one example of a file selection screen displayed on the operation panel.

FIG. 5 is a diagram showing one example of a file selection screen 500 to be displayed in the case where the USB memory print button 401 is pressed on the home screen 400. In the file selection screen 500, print data stored in the USB memory 102 is displayed, and the user can press and select any row of print data. In the present embodiment, a PDF file 502 under the name of "DOC001.pdf" and other image files 503 are displayed. As the image files 503, JPEG files under the names of "PIC001.jpg," "PIC002.jpg," "PIC003.jpg," and "PIC004.jpg" are displayed.

The user selects a file and then presses an enter button 501, thereby shifting to a print setting screen 600 shown in FIG. 6 as will be described later.

Figure 6:
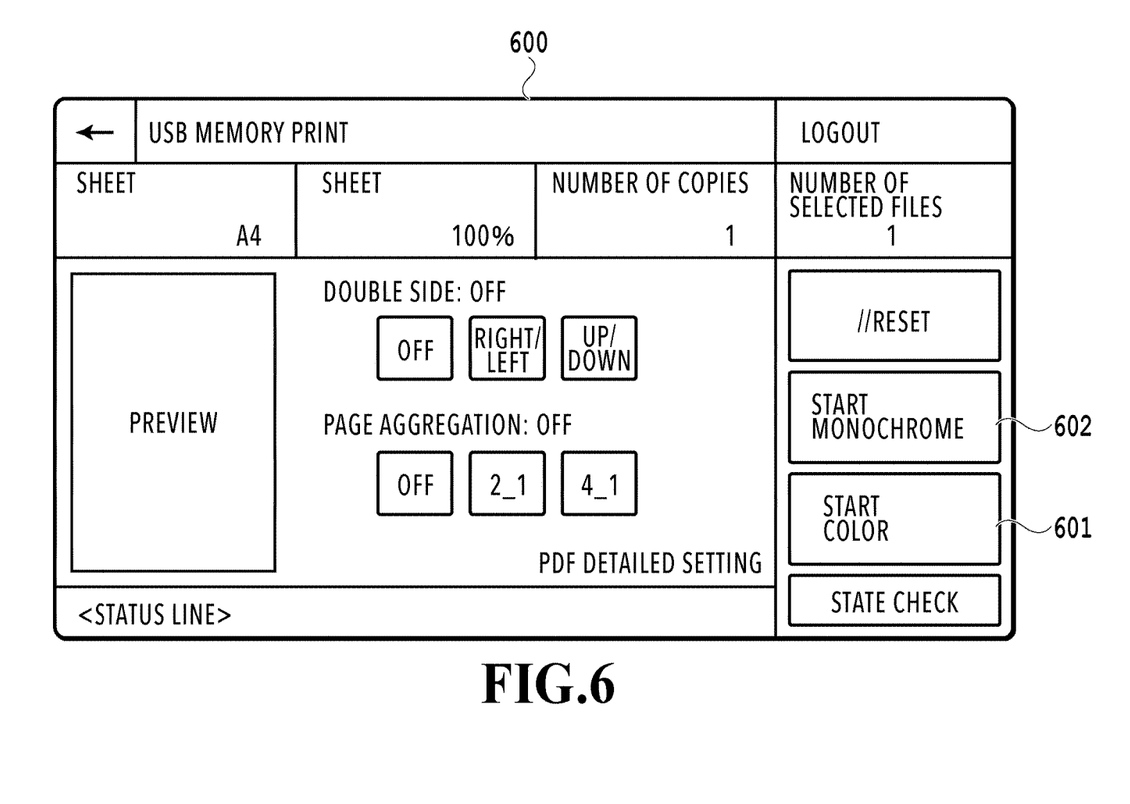
FIG. 6 is a diagram showing one example of a printing setting screen displayed on the operation panel.

FIG. 6 is a diagram showing one example of the print setting screen 600 of the USB memory print function of the image forming apparatus 101 according to the present embodiment. This print setting screen 600 is a screen in the case of selecting a PDF file in the file selection screen 500. In the print setting screen 600, detailed items of printing setting which can be specified by the user are displayed. As the items of printing setting, sheet sizes, brightness, number of copies, number of selected files, printing side, page aggregation, and the like are displayed. A color start button 601 for starting color printing and a monochrome start button 602 for starting monochrome printing are also displayed. As the user specifies arbitrary printing setting and then presses the color start button 601 or the monochrome start button 602, an instruction to implement the USB memory print function is accepted. Once this implementation instruction is accepted, the image forming apparatus 101 starts printing.

Figure 7:
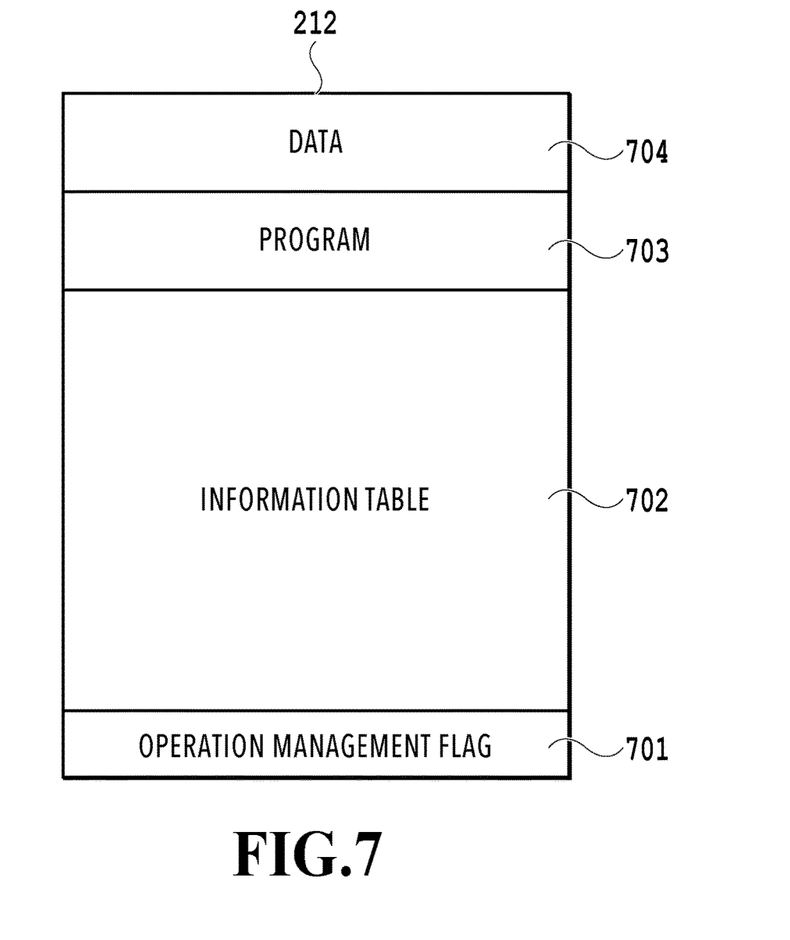
FIG. 7 is a diagram showing one example of an internal area of a RAM shown in FIG. 2.

FIG. 7 is a diagram showing one example of an internal area of the RAM 212 in the image forming apparatus 101 according to the present embodiment. The internal area of the RAM 212 includes an operation management flag storage area 701, an information table area 702, a program area 703, and a data area 704. The operation management flag stored in the operation management flag storage area 701 is a flag indicating the activation status of the PDL processing unit used by a selected function, and any one of three values representing "already activated," "in activation process," and "operation nonmanagement" is stored. For instance, for representing "already activated," the operation management flag is set to [00]. For representing "in activation process," the operation management flag is set to [01]. For representing "operation nonmanagement," the operation management flag is set to [10]. The state "already activated" is set in the case where the PDL comparison unit 306 determines that a specific PDL is processable in a currently active PDL processing unit. The state "in activation process" is set in the case where the PDL comparison unit 306 determines that a specific PDL is unprocessable in a currently active PDL processing unit. The state "operation nonmanagement" is set in the case where a job for USB memory printing has been completed. In addition, this state is also set in the case where the input control unit 302 accepts the selection of a function other than the USB memory printing. The information table area 702 is an area where an information table used for the PDL comparison unit 306 and the support PDL determination unit 311 is stored. The program area 703 is an area where a program code implemented by the CPU 211 is loaded. The data area 704 is an area where data is stored.

Next, in order to facilitate the understandings of the present invention, before describing the flow of software in the image forming apparatus 101 of the present embodiment, one example of the flow of software in a conventional image forming apparatus will be described with reference to FIG. 8.

Figure 8:
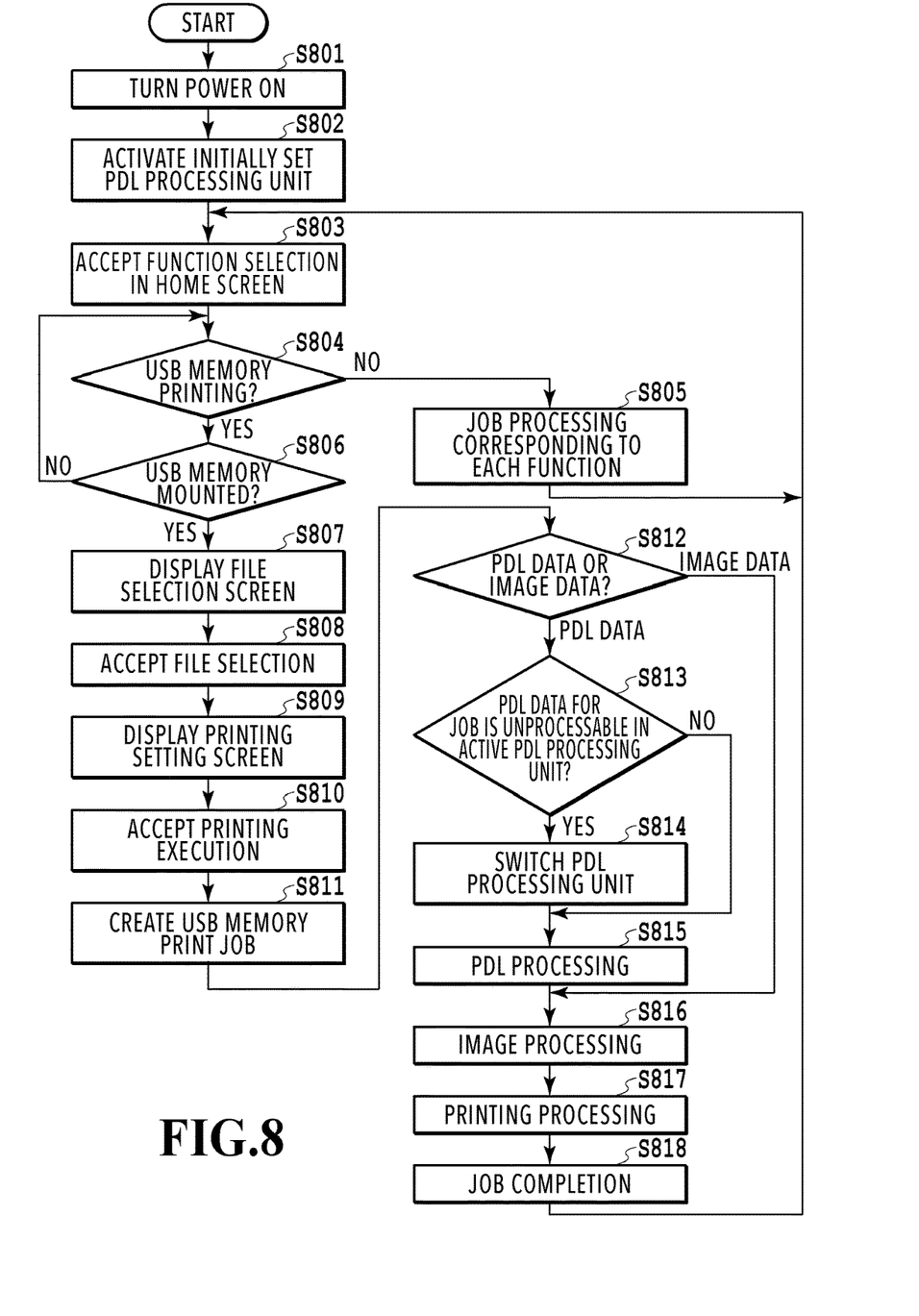
FIG. 8 is a flowchart showing one example in the case of performing USB memory printing in a conventional image forming apparatus.

FIG. 8 is a flowchart showing one example of software processing in the case of performing USB memory printing in the conventional image forming apparatus.

After the power is turned on (Step S801), the PDL management unit 307 activates an initially set PDL processing unit in accordance with an instruction from the job control unit 301 (Step S802). Here, as an example of the initial setting, the LIPS processing unit 3071 is to be activated. The PCL processing unit 3072 and PDF processing unit 3073 will not be activated. As a result of the instruction from the job control unit 301, a memory area as work memory used for enabling print data to be processable in the LIPS processing unit 3071 is reserved in the RAM 212. Then, this work memory is used to activate the LIPS processing unit 3071. The display control unit 303 displays the home screen 400 on the display unit 242 in accordance with an instruction from the job control unit 301 (Step S802).

Next, in Step S803, the input control unit 302 accepts a function selection (pressing a button) by the user in the home screen 400.

Subsequently, the input control unit 302 determines the selected function (Step S804). In the case where a function other than the USB memory printing is selected (NO in Step S804), the process advances to Step S805. In the case where the USB memory printing is selected (YES in Step S804), the process advances to Step S806. In Step S805, the job control unit 301 executes, in accordance with an instruction from the input control unit 302, job processing corresponding to each function. Upon completing this job processing, the process returns to Step S803, and the display control unit 303 displays the home screen 400 in accordance with an instruction from the job control unit 301.

In Step S806, the job control unit 301 determines whether the USB memory 102 is mounted to the USB connector 230. In the case where USB memory is not mounted (NO in Step S806), the process returns to Step S804, where the input control unit 302 determines again whether the USB memory printing has been selected. In the case where USB memory has already been mounted (YES in Step S806), the process advances to Step S807.

In Step S807, the display control unit 303 acquires, in accordance with an instruction from the input control unit 302, file information stored within the USB memory 102 using the USB driver 304, and displays the file selection screen 500 for the USB memory printing.

In Step S808, the input control unit 302 accepts file selection by the user. After the PDF file 502 has been selected, the enter button 501 is pressed, and the process advances to Step S809.

In Step S809, the display control unit 303 displays, in accordance with an instruction from the input control unit 302, the print setting screen 600 for the USB memory printing. The input control unit 302 accepts the user's printing setting instruction (user setting instruction) through the print setting screen 600 for the USB memory printing.

In Step S810, the input control unit 302 accepts the user's pressing of the color start button 601 or the monochrome start button 602. Once the color start button 601 or the monochrome start button 602 is pressed (in response to the entering of accepting a user's instruction), the process advances to Step S811.

In Step S811, the job control unit 301 receives a notice from the input control unit 302 and reads from the USB memory 102 a file (PDF file 502) selected by the user using the USB driver 304. Based on the read file and printing setting specified in Step S809, a USB memory printing job (print job) is created to start job processing.

In Step S812, the job control unit 301 determines whether data of a job corresponds to PDL data (data including a drawing instruction described by a PDL) or corresponds to image data. In the case of corresponding to the PDL data, the process advances to Step S813. In the case of corresponding to the image data, the process advances to Step S816.

In Step S813, the job control unit 301 instructs the PDL comparison unit 306 to execute the PDL comparison processing. The PDL comparison unit 306 uses an information table stored in the information table area 702 in the RAM 212 and determines whether PDL data is unprocessable in a currently active PDL processing unit. If unprocessable (YES in Step S813), the process advances to Step S814. If not unprocessable (NO in Step S813), the process advances to Step S815.

In Step S814, the job control unit 301 instructs the PDL management unit 307 to execute switching processing to the PDL processing unit in which the PDL data for the job is processable. The PDL management unit 307 executes the switching processing. The PDL management unit 307 releases work memory used by the currently active PDL processing unit, and executes processing to disable a PDL analysis function of the activating PDL processing unit. Thereafter, the PDL management unit 307 reserves work memory for the PDF processing unit 3073 which can process a PDL specified by the job control unit 301. By using this work memory, the PDF processing unit 3073 which can process the specified PDL is activated.

In Step S815, the job control unit 301 instructs the PDL management unit 307 to execute PDL processing for the job. The PDL management unit 307 executes the PDL processing in the activating PDF processing unit 3073.

Subsequently, the job control unit 301 instructs the image processing unit 308 to execute image processing. The image processing unit 308 executes the image processing such as color conversion and dither processing for page data created by the PDL processing (Step S816).

Next, the job control unit 301 instructs the printer driver 309 to execute printing processing, and the printer driver 309 outputs an image signal of page data created via the printer I/F 214 on the printer 220 to execute the printing processing (Step S817).

The job control unit 301 completes the job (Step S818). After completion of the job, the process returns to Step S803, and the display control unit 303 displays the home screen 400 in accordance with an instruction from the job control unit 301.

The above is the content of processing in the case of the USB memory printing using the conventional image forming apparatus. Since determination of work memory reservation is made after the acceptance of printing execution, there has been a case where a print job cannot be efficiently processed. Thus, in the present embodiment, the determination of work memory reservation is placed before the acceptance of executing printing, and the following processing is performed. The flow of software in the image forming apparatus 101 of the present embodiment will be described below.

Figure 9:
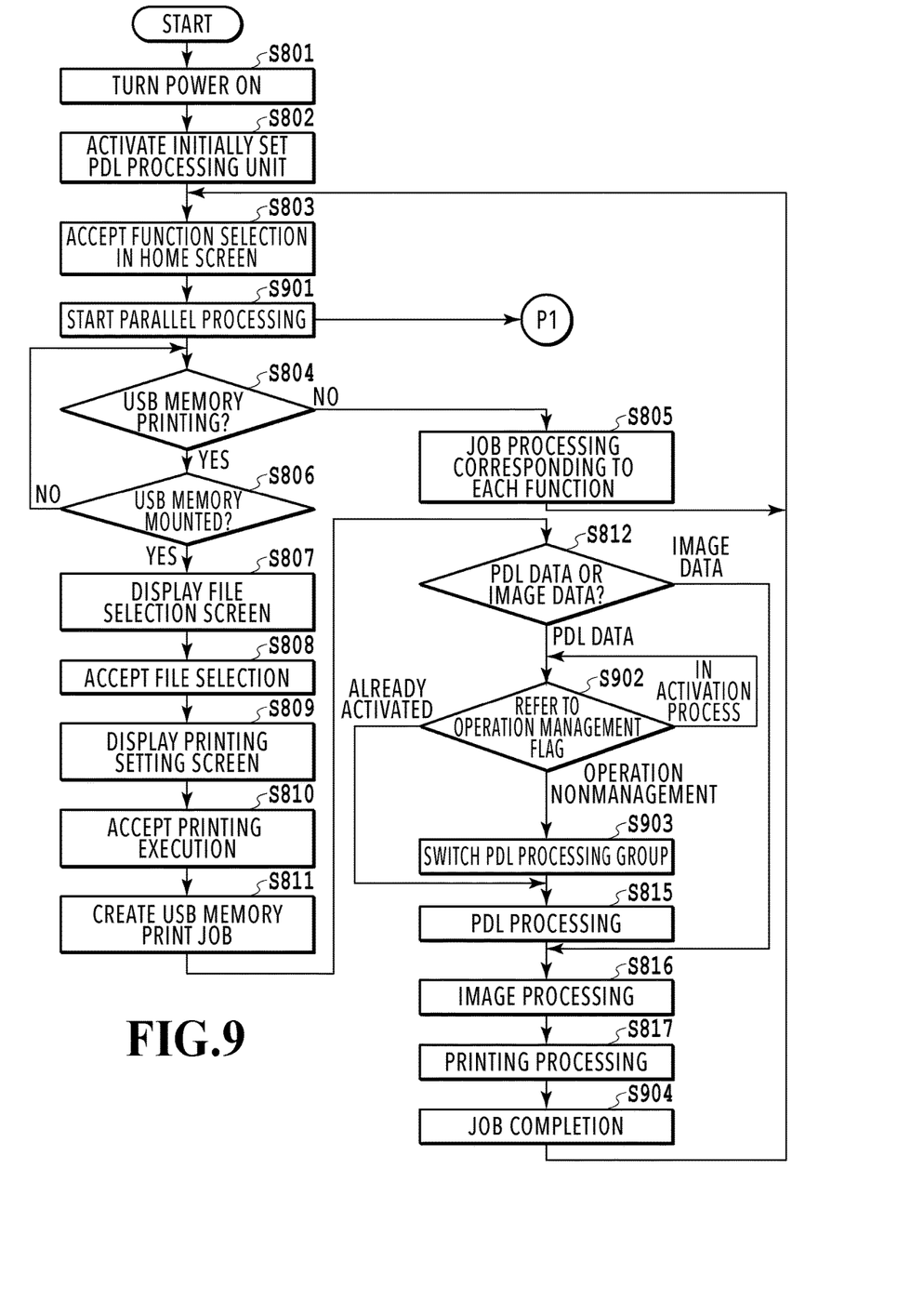
FIG. 9 is a flowchart showing one example in the case of performing USB memory printing in the image forming apparatus according to the first embodiment.

FIG. 9 is a flowchart showing one example of software processing in the case of performing USB memory printing in the image forming apparatus 101 according to the present embodiment. Those steps that are identical to the ones in the flowchart shown in FIG. 8 are denoted by identical numerals, and their detailed descriptions are omitted as appropriate.

Figure 10:
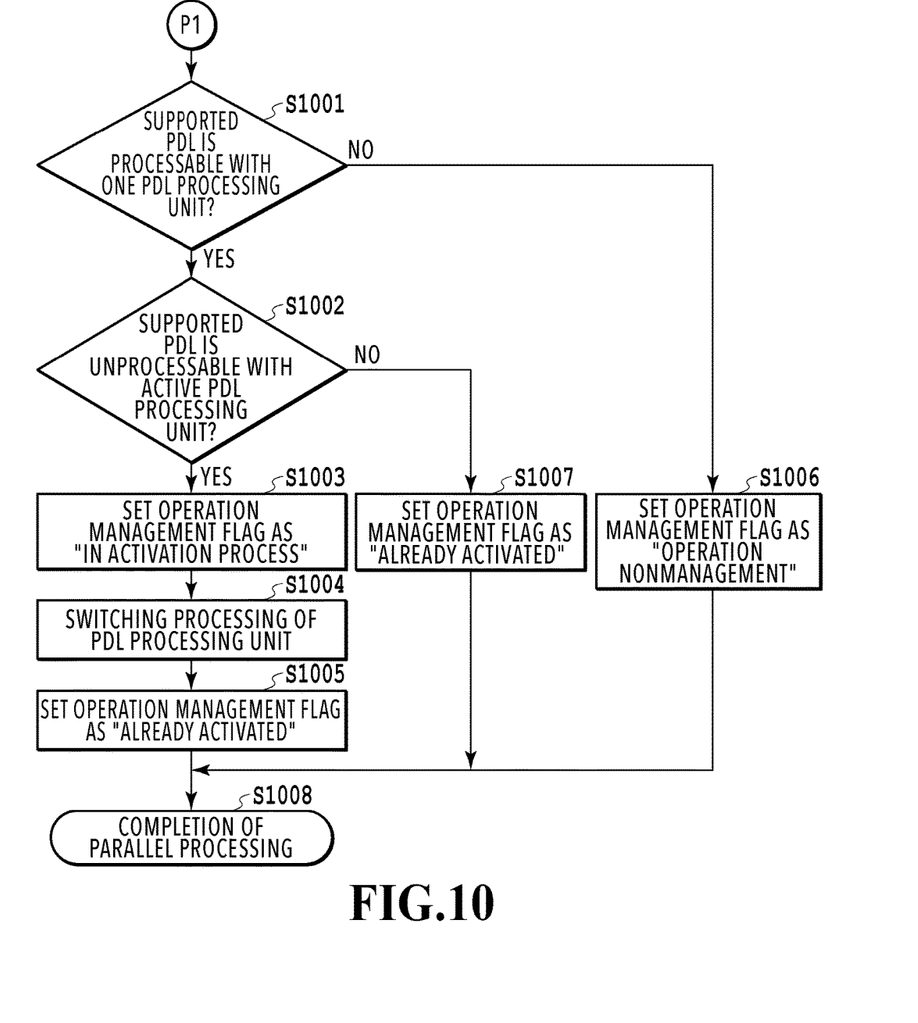
FIG. 10 is a flowchart showing one example of parallel processing P1 started in Step S901 in FIG. 9.

Followed by the processing of Step S801, the processing of Step S802 is performed. Then, in Step S803, once the selection of an instruction for implementing a specific printing function is accepted in the home screen 400, parallel processing P1 shown in FIG. 10 starts (Step S901). FIG. 10 is a flowchart showing one example of the parallel processing P1 started in Step S901 in FIG. 9. The parallel processing P1 is processing performed in parallel to the flow of FIG. 9 within the image forming apparatus 101 after Step S901 in FIG. 9. This processing is not recognized by the user. Further, in comparison with the flow of FIG. 9 in which input is made by the user, the parallel processing P1 is in a high speed because the processing is only executed by the CPU 211. Therefore, all steps of the parallel processing P1 are basically performed within a period corresponding to Step S807 through Step S810 in FIG. 9.

In Step S1001, the support PDL determination unit 311 determines whether a PDL supporting a function selected in the operation panel 240 is processable with one PDL processing unit. The support PDL determination unit 311 reads out a PDL processing unit that may be used by a selected function from the information table and determines whether the read number is one or not. If the supported PDL is processable with one PDL processing unit, and more specifically, if the pressing of the USB memory print button 401 is accepted in the home screen 400 (YES in Step S1001), the process advances to Step S1002. If the supported PDL is not processable with one PDL processing unit, that is, the pressing of a button for implementing a function such as copying, sending facsimile, and scanning in the home screen 400 is accepted (NO in Step S1001), the process advances to Step S1006.

Subsequently, in Step S1002, the support PDL determination unit 311 instructs the PDL comparison unit 306 to execute PDL comparison processing. The PDL comparison unit 306 determines whether the supported PDL (PDF in the case of USB memory printing) is unprocessable with a currently active PDL processing unit. If unprocessable (YES in Step S1002), the process advances to Step S1003. If not unprocessable (NO in Step S1002), the process advances to Step S1007. In the case where the parallel processing P1 is in Step S1002, the file selection screen 500 or the print setting screen 600 is displayed on the display unit 242.

Subsequently, in Step S1003, the support PDL determination unit 311 sets an operation management flag to represent "in activation process" by using the storage processing unit 310.

Subsequently, in Step S1004, the support PDL determination unit 311 instructs the PDL management unit 307 to execute switching processing to a PDL processing unit in which a supported PDL is processable. The PDL management unit 307 executes the switching processing.

Subsequently, in Step S1005, the support PDL determination unit 311 sets an operation management flag to represent "already activated" by using the storage processing unit 310.

In Step S1006, the support PDL determination unit 311 sets an operation management flag to represent "operation nonmanagement" by using the storage processing unit 310.

In Step S1007, the support PDL determination unit 311 sets an operation management flag to represent "already activated" by using the storage processing unit 310.

Once flag setting for the operation management flag is completed, the process advances to Step S1008, and the support PDL determination unit 311 completes the parallel processing P1.

As such, in the parallel processing P1, a PDL processing unit corresponding to PDL data included in a print job associated with selection (user instruction) of the button 401 starts reservation of work memory to be used in analysis processing in response to the pressing (acceptance of user instruction) of the button 401 in the operation panel 240. More specifically, since the job control unit 301 integrally controls each of the software components, it serves as a control unit to control, in response to the selection of the button 401, reservation of work memory to be used in a PDL processing unit corresponding to the button 401.

Followed by the processing of Step S901, processing from Steps S804 to S812 are performed and then advances to Step S902.

In Step S902, the job control unit 301 refers to the operation management flag using the storage processing unit 310. If the operation management flag indicates "in activation process," the processing of Step S902 is performed again, and the process advances to a step corresponding to a type of the operation management flag. If the operation management flag indicates "already activated," the process advances to Step S815. If the operation management flag indicates the "operation nonmanagement," the process advances to Step S903.

In Step S903, the job control unit 301 instructs the PDL management unit 307 to execute switching processing to a PDL processing unit in which PDL data is processable. Accordingly, even if the parallel processing P1 is delayed, the switching processing can be reliably performed.

Subsequently, processing from Steps S815 to S817 are performed and then advances to Step S904.

In Step S904, the job control unit 301 sets an operation management flag to represent "operation nonmanagement" by using the storage processing unit 310 and completes the print job. Once the print job is completed, the process returns to Step S803, and the display control unit 303 displays the home screen 400 in accordance with an instruction from the job control unit 301.

The above is the content of processing in the case of the USB memory printing in the image forming apparatus 101 of the present embodiment. Since the determination of reservation of work memory is made before the acceptance of executing printing, a print job can be processed more efficiently. More specifically, in response to the acceptance (instruction selection) of pressing of the USB memory print button 401, which is earlier than timing of the acceptance of executing printing (the pressing of the buttons 601, 602), reservation of work memory to be used in the PDF processing unit 3073 corresponding to the button 401 can be started. In other words, at a stage in which a user's instruction for implementing a specific printing function is accepted in the operation panel 240, reservation of work memory to be used in a PDL processing unit corresponding to PDL data included in a print job associated with the user's instruction can be started. Due to this, processing of PDL data can be promptly started. Accordingly, a print job can be processed more efficiently while achieving memory saving on work memory for supporting a plurality of PDL data of different types. As a result, a period of time required for implementing a specific printing function (printing time period) can be reduced.

The above-described image forming apparatus 101 further includes the PDL comparison unit 306, the PDL management unit 307, and the support PDL determination unit 311. Accordingly, at the stage of accepting the pressing of the USB memory print button 401, a corresponding PDL processing unit as needed can be activated while achieving memory saving on work memory for supporting a plurality of PDL data of different types. As a result, a time period required for processing a print job can be reliably reduced compared to the case of not reserving work memory to be used in the PDL processing unit before starting the job.

MODIFIED EXAMPLE

A modified example of the present embodiment will be described below.

The present invention may also be applied to an image forming apparatus including a function of printing a document (for example, a PDF file) stored beforehand in the storage processing unit, in which implementation of this function is instructed upon the pressing of a button in the home screen of the operation panel.

The present invention may also be applied to an image forming apparatus including a PDL processing unit in which PDL data such as an XPS file is processable.

As an area to store data to be processed, an external storage apparatus such as an SD card can also be used.

The PDL management unit 307 can divide a plurality of PDL processing units into groups to manage those operations by each group unit. For instance, the LIPS processing unit 3071 and the PDF processing unit 3073 can be managed in one group. Also, the PCL processing unit 3072 and the PDF processing unit 3073 can be managed in one group. In such a case, the balance between switching processing and reserved work memory can be retained, which is effective due to enhanced convenience.

It is also possible to set a PDL processing unit other than the LIPS processing unit 3071 to be activated upon turning the power on. Further, it is also possible to start reserving work memory for a PDL processing unit in which a PDL that supports a selected button is processable after the acceptance of the pressing of a button for implementing a specific printing function in the home screen of the operation panel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a print job can be processed more efficiently while achieving memory saving on work memory for supporting a plurality of PDL data of different types.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155917, filed Aug. 10, 2017, which is hereby incorporated by reference herein in its entirety.

What is claimed is:

1. An image processing apparatus comprising:
   a plurality of PDL processing units configured to execute analysis processing corresponding to a type of PDL data;
   an operation unit configured to accept a user's instruction for implementing a specific printing function;
   a control unit configured to control execution of printing processing based on the user's instruction accepted by the operation unit, wherein
   the control unit starts, in accordance with the acceptance of the user's instruction by the operation unit, reserving work memory to be used for the analysis processing by a PDL processing unit, among the plurality of PDL processing units, which corresponds to PDL data included in a print job associated with the user's instruction,
   a support PDL determination unit configured to determine whether PDL data that supports the user's instruction accepted by the operation unit is processable by one PDL processing unit;
   in a case where the support PDL determination unit determines the PDL data to be processable, a comparison unit configured to determine whether PDL data that supports the user's instruction accepted by the operation unit differs from PDL data that is processable by an active PDL processing unit; and
   in a case where a difference is determined by the comparison unit, a switching unit configured to activate the one PDL processing unit determined by the support PDL determination unit in a manner of releasing the work memory used by the active PDL processing unit, then reserving the work memory to be used by the one PDL processing unit determined by the support PDL determination unit, and using the work memory that has been reserved.

2. The image processing apparatus according to claim 1, wherein the control unit starts reserving the work memory before accepting a user setting instruction for setting the specific printing function by the operation unit.

3. The image processing apparatus according to claim 1, wherein the control unit starts reserving the work memory before entering the acceptance of the user's instruction by the operation unit.

4. The image processing apparatus according to claim 1, further comprising a management unit configured to divide the plurality of PDL processing units into a plurality of groups and manage those operations by each group unit.

5. The image processing apparatus according to claim 1, wherein the control unit starts, in accordance with entering of the acceptance of the user's instruction by the operation unit, analysis processing of PDL data by the PDL processing unit by using the work memory that has been reserved.

6. An image forming apparatus comprising:
the image processing apparatus recited in claim 1; and
a printing unit configured to print page data created by way of analysis processing executed by the PDL processing unit of the image processing apparatus.

7. An image processing apparatus according to claim 1, wherein the PDL processing unit is configured to interpret a drawing instruction by a LIPS, interpret a drawing instruction by a PCL, and interpret a drawing instruction of a PDF file which is an electronic document format of data including a PDF drawing instruction by a LIPS.

8. An image processing method comprising the steps of:
PDL processing for executing analysis processing by using a plurality of PDL processing units that execute analysis processing corresponding to a type of PDL data;
operating for accepting a user's instruction to implement a specific printing function;
controlling execution of printing processing based on the user's instruction accepted by the operating step, wherein
the controlling step starts, in accordance with the acceptance of the user's instruction by the operating step, reserving work memory to be used for the analysis processing by a PDL processing unit, among the plurality of PDL processing units, which corresponds to PDL data included in a print job associated with the user's instruction;
determining in a support PDL determination unit whether PDL data that supports the user's instruction accepted by the operation unit is processable by one PDL processing unit;
in a case where the support PDL determination unit determines the PDL to be processable, determining whether PDL data that supports the user's instruction accepted by the operation unit differs from PDL data that is processable by an active PDL processing unit; and
in a case where a difference is determined, activating the one PDL processing unit determined by the support PDL determination unit in a manner of releasing the work memory used by the active PDL processing unit, then reserving the work memory to be used by the one PDL processing unit determined by the support PDL determination unit, and using the work memory that has been reserved.

9. An image processing method according to claim 8, wherein the PDL processing unit interprets a drawing instruction by a LIPS, interprets a drawing instruction by a PCL, and interprets a drawing instruction of a PDF file which is an electronic document format of data including a PDF drawing instruction by a LIPS.

10. A non-transitory computer readable storage medium storing a program for causing a computer to function as an image processing apparatus,
where the image processing apparatus comprises:
a plurality of PDL processing units configured to execute analysis processing corresponding to a type of PDL data;
an operation unit configured to accept a user's instruction for implementing a specific printing function; and
a control unit configured to control execution of printing processing based on the user's instruction accepted by the operation unit, wherein
the control unit starts, in accordance with the acceptance of the user's instruction by the operation unit, reserving work memory to be used for the analysis processing by a PDL processing unit, among the plurality of PDL processing units, which corresponds to PDL data included in a print job associated with the user's instruction,
a support PDL determination unit configured to determine whether PDL data that supports the user's instruction accepted by the operation unit is processable by one PDL processing unit;
in a case where the support PDL determination unit determines the PDL data to be processable, a comparison unit configured to determine whether PDL data that supports the user's instruction accepted by the operation unit differs from PDL data that is processable by an active PDL processing unit; and
in a case where a difference is determined by the comparison unit, a switching unit configured to activate the one PDL processing unit determined by the support PDL determination unit in a manner of releasing the work memory used by the active PDL processing unit, then reserving the work memory to be used by the one PDL processing unit determined by the support PDL determination unit, and using the work memory that has been reserved.

11. A non-transitory computer readable storage medium according to claim 10, wherein the PDL processing unit is configured to interpret a drawing instruction by a LIPS, interpret a drawing instruction by a PCL, and interpret a drawing instruction of a PDF file which is an electronic document format of data including a PDF drawing instruction by a LIPS.

* * * * *